Jan. 6, 1925.

L. K. STAFFORD 1,521,974

ROLLER BEARING JOURNAL BOX

Filed July 3, 1922

L. K. Stafford
INVENTOR

BY Victor J. Evans
ATTORNEY

Patented Jan. 6, 1925.

1,521,974

UNITED STATES PATENT OFFICE.

LEO KIMBALL STAFFORD, OF LAWTON, MICHIGAN, ASSIGNOR TO THE STAFFORD ROLLER-BEARING CAR TRUCK CORPORATION, OF LAWTON, MICHIGAN, A CORPORATION OF NEW JERSEY.

ROLLER-BEARING JOURNAL BOX.

Application filed July 3, 1922. Serial No. 572,374.

*To all whom it may concern:*

Be it known that I, LEO KIMBALL STAFFORD, a citizen of the United States, residing at Lawton, in the county of Van Buren and State of Michigan, have invented new and useful Improvements in Roller-Bearing Journal Boxes, of which the following is a specification.

An object of my present invention is to produce a roller bearing journal box for railway trucks.

A further object is to produce a journal box for railway trucks in which the axle spindle finds a bearing on anti-frictional rollers of a construction set forth in my U. S. Patent No. 1,370,377, but in which the lateral thrust means is of a simpler construction than that disclosed in the said patent, the improvement being primarily devised for use on freight cars.

It is a further object to produce a roller bearing journal box for railway trucks in which the body thereof comprises a boxing and a cover which is bolted to the boxing, said cover being provided with means whereby a lubricant may be fed to the roller bearings which are arranged between the box and the journal, while on the journal and disposed to the ends of the cages for the roller bearings there are thrust members, one of which being bolted to the outer end of the journal and in the path of contact with a manganese plate secured on the inner face of the cover, the other being in the nature of a ring member which, however, is revoluble with the journal and providing an oil retaining and dust excluding means, the same having peripheral grooves in which are seated split spring rings that are doweled or otherwise secured to the boxing.

The foregoing, and other objects which will present themselves as the nature of the invention is better understood, may be accomplished by a construction, combination and operative association of parts such as is disclosed by the drawings which accompany and form part of this application.

In the drawings:—

Figure 1:
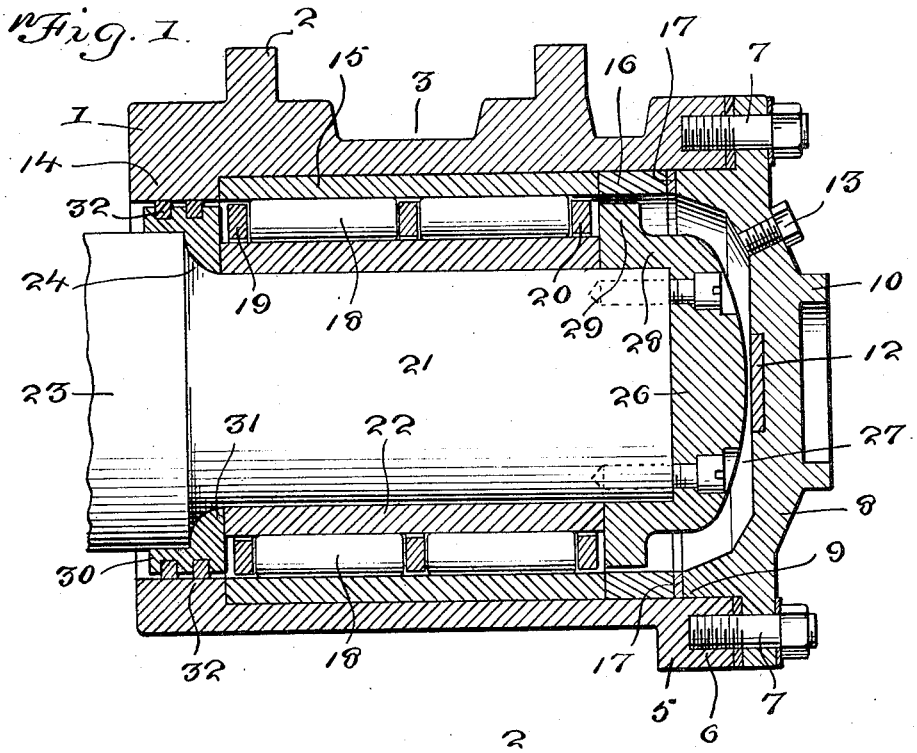
Figure 1 is an approximately central vertical longitudinal sectional view through the improvement, the journal being in elevation.
Figure 2:
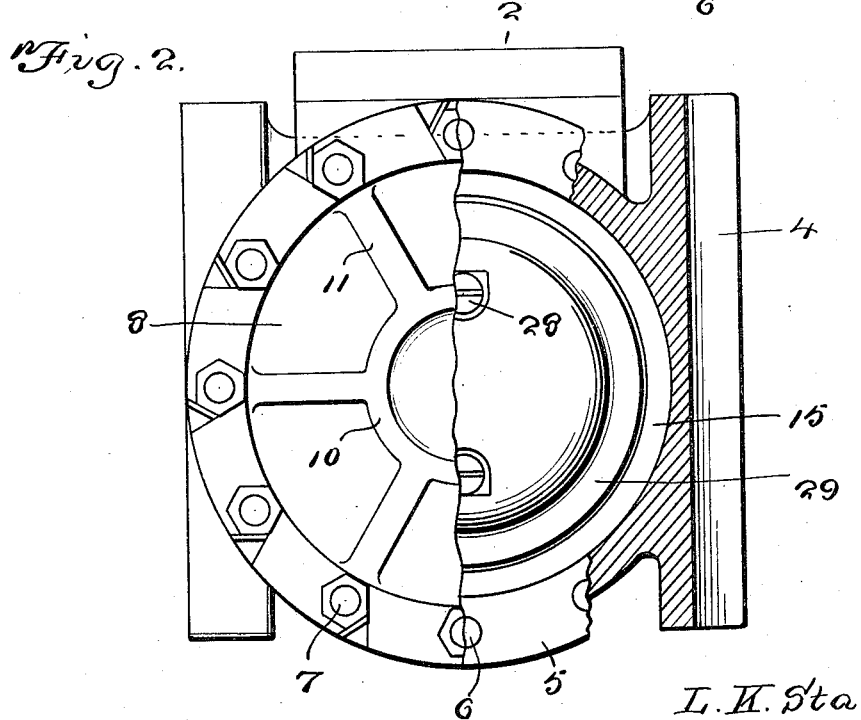
Figure 2 is a front elevation of the improvement with parts broken away and parts in section.

As disclosed by the drawings, the body 1 of my improved journal box is preferably of a tubular formation, the same having its top provided with spaced outstanding ribs 2 and a central depression 3 inward of the ribs for the reception of the upper frame bars of a truck (not shown), while the sides of the body 1 are provided with spaced outstanding ribs 4 between which pass the bolts that connect the upper and lower frame bars of the truck.

The body or boxing 1 has its outer end formed with an annular enlargement 5 provided, at spaced intervals with threaded openings 6, the said openings receiving therein the bolts 7 that secure the cover 8 on the front of the boxing. The cover 8 has its inner face substantially dished and is also provided with an inwardly directed flange 9 that rests in the bore of the boxing 1. On its outer face, the cover is formed with a central annular rib 10 and with any desired number of radial ribs 11 projecting therefrom and terminating adjacent the periphery of the cover. The ribs materially reinforce the cover, and seated in the cover at the center thereof there is a manganese plate 12 for a purpose which will presently be apparent. The cover 8 is provided with an angularly arranged opening that enters from adjacent the top thereof, the said opening being threaded for the reception of a pipe plug 13, the said opening, when the plug is removed, providing a means whereby a lubricant can be fed into the box.

The box, adjacent its rear open end is formed with an inwardly extending flange or enlargement 14, and swaged in the box, in contacting engagement with the inner shoulder of the flange 14 there is a bushing 15 of chrome bearing steel. The bushing 15 preferably does not extend the entire length of the bore of the box, but is in contacting engagement with a filler ring 16 which is of a baser metal than the bushing. The filler ring is comparatively freely mounted in the boxing and is designed to have its end adjacent the flange 9 of the cover 8 contacted by any desired number of ring washers 17 whereby the end thrust of the journal may be compensated for in a manner which will be presently apparent.

In contacting engagement with the bushing there are anti-frictional rollers 18 of a construction set forth in detail in my referred to Patent No. 1,370,377, the ring members comprising the outer elements of the cages for the said rollers being, in this instance, indicated for distinction by the numerals 19 and 20 respectively.

The journal, received in the box, has on its spindle end 21 a swaged bushing 22 disposed directly opposite the bushing 15 and constructed of a similarly hardened metal. The fillet between the spindle and the axle portion 23 of the journal is, for distinction, indicated by the numeral 24.

The outer end of the spindle 21 has arranged thereon a thrust hood 26. The hood is in the nature of a flanged cap, the outer surface of which being rounded from its center to its sides, as indicated for distinction by the numeral 27. The central rounded portion of the thrust hood is disposed slightly out of contact with the plate 12 in the cover 8, the outer surface of the hood opposite the said center thereof being provided with an annular series of openings and being depressed laterally in a line with the openings. Through these openings there are passed bolt members 28 that enter threaded openings in the ends of the spindle 21. The inner and open end of the thrust hood is provided with an annular outstanding flange 29 and is disposed in contacting engagement with the bushing 22, and directly opposite the cage member 20.

Secured around the journal there is a ring member 30, the same having its inner end provided with an inwardly directed flange 31, and the inner shoulder of the flange is rounded to tightly contact with the fillet 24 of the journal. The flange 31 has its opposite face in contacting engagement with the bushing 22 and is disposed opposite the cage member 19. The ring member is designed to revolve with the journal, and therefore may be swaged or otherwise secured thereto, it being essential that a tight joint be maintained between the said journal and the said ring. The ring member is of a construction whereby the outer periphery thereof is comparatively wide and is provided with spaced annular grooves in which there are seated split spring piston rings 32, the said rings being doweled or otherwise secured in the bore of the boxing 1.

A sufficient quantity of lubricant is fed into the box. The cover plate prevents the outlet of the lubricant at the front of the box, while the ring 30 not only prevents the escapement of lubricant at the rear of the box, but also prevents the entrance of dust in the box. The effectiveness of the roller bearings have been clearly set forth in my referred to patent, and in my present construction, longitudinal thrust between the journal and the box is taken up by a simpler but as effective means as set forth in my said patent. It will be apparent that the turning journal with the hood having the rounded outer face therein when brought to contact with the hardened plate 12 carried by the cover 8, will be effectively compensated for. It is to be noted that incident to the rounded outer face of the thrust hood 26, only the center thereof will engage the hardened plate 12 in the cover 8 and that only the slightest amount of friction will occur between the revolving thrust head and the plate. This is an important feature of the invention as the construction obviates any grinding action between the meeting parts and thus reduces friction to a minimum. By adjusting the washers 17 between the cover and the ring 16, that is by adding to or removing certain of the washers, the plate 12 in the cover 8 may be adjusted with respect to the rounded outer surface of the thrust hood, and it is believed that the foregoing description, when taken in connection with the drawings will fully set forth the construction and advantages of the improvement to those skilled in the art to which this invention relates, so that further detailed description will not be required.

Having described the invention, I claim:—

1. A journal box for the spindles of axles, a cover having its inner face dished removably and adjustably secured to the outer end of the box, said cover having a hardened plate let in the center of its inner face, a journal having its spindle received in the journal box, anti-frictional bearings between the spindle and box, an oil ring swaged on the spindle at its juncture with the journal and provided with peripheral grooves, piston rings in the grooves and secured to the journal box, a thrust hood having its outer face rounded and secured to the outer end of the spindle and having the center thereof disposed in close proximity to the hardened plate in the cover and the center thereof contactable with said plate upon the longitudinal movement of the spindle in the box.

2. A journal box for the spindles of axles, comprising a boxing, a cover removably and adjustably secured on the outer end thereof, said cover having its inner face dished and the central straight portion thereof centrally recessed, a plate of hardened steel let in the recess and having its outer face flush with the inner face of the cover, a journal having its spindle received in the boxing, anti-frictional rollers between the spindle and boxing, a thrust hood on the outer end of the spindle flanged to provide a stop for the cages of the anti-frictional rollers, said thrust hood being of hardened metal and having its outer face rounded and the center of said face disposed in close proximity to the center of the hardened plate in the cover, a ring swaged on the portion of the journal received in the boxing and having an inner peripheral flange contacting with the fillet between the spindle and journal and swaged thereon, said ring having outer peripheral grooves, a split spring piston ring in each groove, and each of said piston rings being secured to the boxing.

3. A journal box for the spindles of axles open at both ends and having its rear end formed with an inwardly directed annular flange, a bushing of hardened metal swaged in the boxing and having its inner end contacting the shoulder of the flange, a journal having its spindle received in the boxing, a bushing of hardened metal swaged thereon, a ring member of hardened metal swaged on the journal, and having a flanged portion on its inner periphery swaged on the fillet that provides the juncture between the spindle and journal, said ring having spaced peripheral grooves, split spring piston rings in the grooves and secured to the boxing, anti-frictional rollers caged between the bushings, a cover removably and adjustably secured on the outer end of the boxing, having an inwardly directed flange in contact with the bore of the boxing and having its inner face dished from said flange and a hardened plate let therein, adjustable and removable ring means engaged between the flange of the cover and the outer edge of the first mentioned bushing, a thrust hood surrounding and secured to the outer end of the spindle, said hood having an inner flange contactable with the outer end of the inner bushing and extending therefrom to provide a stop element for the cages of the rollers, and said thrust hood having its outer face rounded outwardly from the sides to the center thereof and the said center normally disposed in close proximity to the hardened plate in the cover and engageable therewith upon a longitudinal movement of the journal in the boxing.

4. A journal box for the spindles of axles, comprising a box having open ends and an inwardly directed flange at the inner end thereof, a cover having an inwardly directed flange received in the bore of the box, means removably securing the cover to the box, said cover having a hardened plate let in its inner face and having a threaded opening adjacent its top, a pipe plug closing the opening, reinforcing flanges on the outer face of the cover, a spindle in the box, anti-frictional rollers therefor, bushings in contact with the rollers and swaged respectively in the box and on the spindle, a filler ring between the box bushing and the cover, removable and interchangeable ring washers between the filler ring and the flange of the cover, a thrust hood removably secured to the outer end of the spindle having an inner flange in contact with the spindle bushing and disposed opposite one end of the roller cage, said hood having its outer end rounded and the center thereof disposed in close proximity to the hardened plate in the cover, a flanged ring secured on the spindle, in contact with the opposite end of the spindle bushing and disposed in close proximity to the inner end of the cage, said ring having peripheral grooves, and split spring piston rings received in the grooves and secured in the bore of the box.

5. In combination with a journal box having a cap closing its outer end and having let in its inner face a plate of hardened metal, and a journal having its spindle mounted on anti-frictional bearings in the box, of a thrust hood secured to the outer end of the spindle, and comprising a member of hardened metal whose outer face is rounded from its center to its sides and whose outer central portion is disposed in close proximity to the hardened plate, for the purpose set forth.

In testimony whereof I affix my signature.

LEO KIMBALL STAFFORD.